United States Patent [19]

Hernandez

[11] 4,186,686

[45] Feb. 5, 1980

[54] PROSTHETIC SPUR FOR FIGHTING COCKS

[75] Inventor: Silverio Hernandez, Philadelphia, Pa.

[73] Assignee: Conquest Manufacturing Co., Inc., Philadelphia, Pa.

[21] Appl. No.: 844,970

[22] Filed: Oct. 25, 1977

[51] Int. Cl.² ............................................. A01K 45/00
[52] U.S. Cl. ........................................ 119/1; 119/143
[58] Field of Search ................... 119/1, 143; 3/17 R, 3/15, 18; 30/232, 297, 298

[56] References Cited

U.S. PATENT DOCUMENTS

| 2,694,254 | 11/1954 | Benbow | 119/1 X |
| 3,224,412 | 12/1965 | Fuentes, Jr. | 119/1 |

Primary Examiner—Hugh R. Chamblee
Attorney, Agent, or Firm—Harding, Earley & Follmer

[57] ABSTRACT

A prosthetic spur for fighting cocks made of aluminum and provided with a socket adapted to fit onto an existing stump of the fighting cock where its natural spur would grow and having a pointed arcuate shape.

5 Claims, 8 Drawing Figures

PROSTHETIC SPUR FOR FIGHTING COCKS

BACKGROUND OF THE INVENTION

This invention relates to spurs for fighting cocks. The spurs in use today are made of stainless steel or fiberglas and have not been entirely satisfactory. The present-day spurs are usable a relatively few number of times, become contaminated easily and inflict excessive wounds which require a long time to heal. The stainless steel spurs are also relatively heavy.

SUMMARY OF THE INVENTION

It is the general object of the invention to provide a prosthetic spur for fighting cocks which (1) is more durable (40 to 50 times present day spurs) and does not break, (2) does not contaminate, (3) inflicts only slight wounds which heal faster, and (4) has a minimum weight.

The spurs in accordance with the invention are made of a polished aluminum which is durable and light in weight. Moreover, since aluminum has no pores it can be kept clean and thereby contamination can be prevented. Further, it has been found that the aluminum spurs in accordance with the invention inflict only slight wounds which heal faster.

DETAILED DESCRIPTION OF THE PREFERRED EMBODIMENTS

Figure 1:
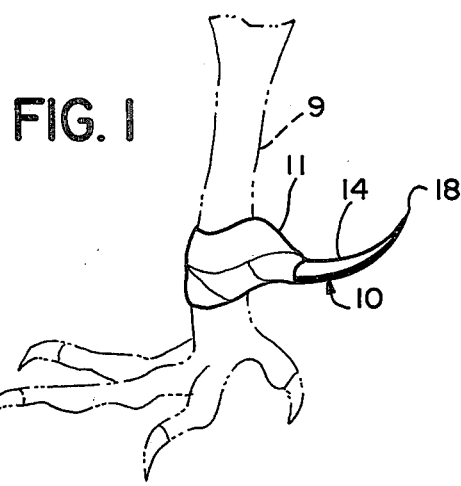
FIG. 1 is a view of the foot of a fighting cock having a spur, made in accordance with the invention, attached thereon.

Referring initially to FIGS. 2 to 4 and 8, there is shown a spur 10 made in accordance with the invention and attached to a leg 9 of a fighting cock by means including adhesive tape 11. Spur 10 is composed of a socket portion 12 joined to a pointed portion 14. The socket portion 12 defines an internal cavity 16 having a dome-like configuration, and the cavity 16 is adapted to fit over the existing stump on a fighting cock where its natural spur would grow.

Figure 2:
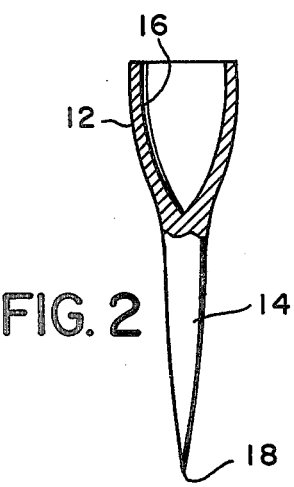
FIG. 2 is a front view, party in section, of a spur in accordance with the invention.
Figure 3:
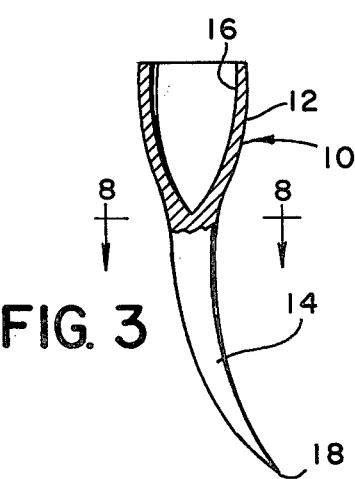
FIG. 3 is a side view, partly in section, of the spur shown in FIG. 2.
Figure 4:
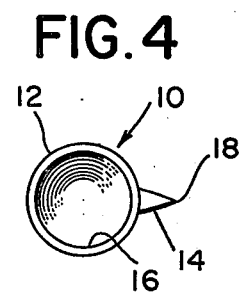
FIG. 4 is a top view of the spur shown in FIG. 2.

The pointed portion 14 tapers inwardly from the socket portion to a point 18 in an arcuate configuration best shown in FIG. 3. The radius of curvature of the arcuate pointed portion 14 in FIG. 3 is approximately one and a half inches. To illustrate the nature of the taper, the upper end 14a of pointed portion 14 where it joins with socket portion 12 has a width as viewed in FIG. 2 of about 0.15 inches and successive portions approximately equally spaced along the length of the pointed portion 14 toward the pointed end 18 have widths of approximately 0.12 inches, 0.09 inches and 0.05 inches.

The socket portion 12 has a width at its upper end of ⅜ of an inch and then tapers down to the upper end dimension of about 0.15 inches for the pointed portion 18.

Figure 7:
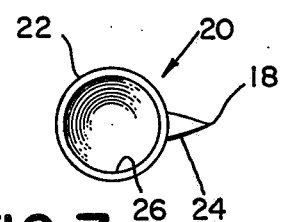
FIG. 7 is a top view of the spur shown in FIG. 5.
Figure 5:
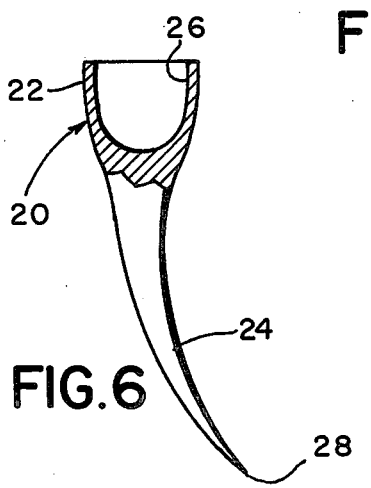
FIG. 5 is a front view, partly in section of another spur made in accordance with the invention.
Figure 6:
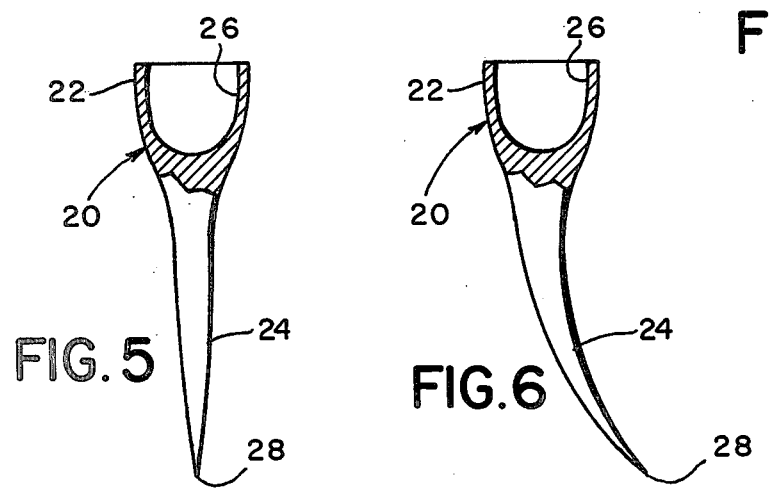
FIG. 6 is a side view, partly in section, of the spur shown in FIG. 5.

Referring to FIGS. 5 to 7, there is shown a spur 20 made in accordance with the invention composed of a socket portion 22 joined with a pointed portion 24. The socket portion 22 defines an internal cavity 26 having a dome-like configuration which is adapted to fit over the existing stump on the fighting cock where its natural spur would grow. At its upper end the socket has a width of about ⅜ of an inch and at its lower end where it joins the pointed portion has a width of about 0.15 inches. The pointed portion 24 tapers inwardly from the socket portion to a point 28 in an arcuate configuration best shown in FIG. 6. The radius of curvature of this arcuate portion is about 1⅝ inches and the taper thereof is approximately the same as that of the spur shown in FIGS. 2 to 4 although it is slightly thicker.

The overall vertical height of the spurs 10 and 20 as viewed in FIGS. 2 and 5 is about 1.35 inches.

It is to be noted that the depth of the cavity 16 of the spur 10 extends almost the entire depth of the socket portion 12 and is considerably longer than the comparatively shorter depth socket 26 of the spur 20. The spur 20 is thus adapted to fit slightly wider and shorter stumps as compared with the spur 10 which is adapted to fit longer narrower stumps.

The spur in accordance with the invention is affixed to the leg stump of the fighting cock where its natural spur would grow as is shown in FIG. 1. A suitable glue is applied to the stump of the fighting cock and the socket of the spur is placed thereover and positioned relative to the leg in the position shown in FIG. 1. A suitable adhesive tape is then wrapped around the leg of the fighting cock and the socket portion of the spur as shown in FIG. 1 to affix the spur to the leg of the fighting cock.

Figure 8:
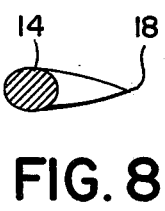
FIG. 8 is a view in section taken as indicated by the lines and arrows 8—8 which appear in FIG. 3.

As shown in FIG. 8, the spur 10 has an ellipse-like cross section with the longer dimension extending in the direction of the curvature of the pointed portion 14. The spur 20 has a similar cross section. This shape of the spur enhances the strength and piercing action thereof.

The spurs made in accordance with the invention are made of aluminum which is polished to remove the pores from the surface thereof. The material is preferably a 7075-T6 aluminum having a minimum ultimate strength of about 77,000 p.s.i. and a minimum yield strength of about 66,000 p.s.i. The chemical analysis of the spurs is as follows:

0.40%—silicon
0.50%—iron
1.2–2.0%—copper
0.30%—manganese
2.1–2.9%—magnesium
0.18–0.35%—chrome
5.1–6.1%—zinc
0.20%—titanium
0.10%—others Aluminum constitutes the remainder.

It has been found that spurs in accordance with the invention last 40 to 50 times longer than the prior existing spurs. Moreover, since they are made of aluminum they are light in weight and have no pores therein so that they can be kept clean and thereby prevent contamination. Further, it has been found that the aluminum spurs of the invention inflict only slight wounds which heal faster than wounds inflicted by conventional spurs.

I claim:

1. A spur for fighting cocks comprising a socket portion providing a cavity adapted to fit on the existing stump of a fighting cock where its natural spur would grow, and a pointed portion extending from said socket portion in a tapered arcuate configuration, said pointed portion terminating in a point at the end thereof opposite said socket portion, said spur being made of a light weight aluminum, said arcuate pointed portion having an ellipse-like cross section with the long dimension extending in the direction of curvature thereof, the surface of the aluminum spur being polished to remove the pores therefrom, said aluminum spur having a minimum ultimate strength of about 77,000 p.s.i. and a mimimum yield strength of about 66,000 p.s.i.

2. A spur for fighting cocks comprising a socket portion providing a cavity adapted to fit on the existing stump of a fighting cock where its natural spur would grow, and a pointed portion extending from said socket portion in a tapered arcuate configuration, said pointed portion terminating in a point at the end thereof opposite said socket portion, said spur being made of a light weight aluminum, the surface of the aluminum spur being polished to remove the pores therefrom, said aluminum spur having a minimum ultimate strength of about 77,000 p.s.i. and a minimum yield strength of about 66,000 p.s.i.

3. A spur for fighting cocks comprising a socket portion providing a cavity adapted to fit on the existing stump of a fighting cock where its natural spur would grow, and a pointed portion extending from said socket portion in a tapered arcuate configuration, said pointed portion terminating in a point at the end thereof opposite said socket portion, said spur being made of a light weight aluminum, said cavity extending approximately the entire depth of said socket portion for fitting a relatively long stump, said pointed portion having a radius of curvature of approximately one and one-half to one and five-eighths inches.

4. A spur for fighting cocks comprising a socket portion providing a cavity adapted to fit on the existing stump of a fighting cock where its natural spur would grow, and a pointed portion extending from said socket portion in a tapered arcuate configuration, said pointed portion terminating in a point at the end thereof opposite said socket portion, said spur being made of a light weight aluminum, said pointed portion having a radius of curvature of approximately one and one-half to one and five-eighths inches.

5. A spur for fighting cocks comprising a socket portion providing a cavity adapted to fit on the existing stump of a fighting cock where its natural spur would grow, and a pointed portion extending from said socket portion in a tapered arcuate configuration, said pointed portion terminating in a point at the end thereof opposite said socket portion, said spur being made of a light weight aluminum, said pointed portion having a radius of curvature of approximately one and one-half to one and five-eighths inches, said arcuate pointed portion having an ellipse-like cross section with the long dimension extending in the direction of curvature thereof.

* * * * *